(12) United States Patent
Hata

(10) Patent No.: US 12,493,404 B2
(45) Date of Patent: Dec. 9, 2025

(54) NON-TRANSITORY COMPUTER-READABLE RECORDING MEDIUM STORING COMPUTER-READABLE INSTRUCTIONS FOR TERMINAL DEVICE, TERMINAL DEVICE, AND CONTROL METHOD FOR TERMINAL DEVICE

(71) Applicant: BROTHER KOGYO KABUSHIKI KAISHA, Nagoya (JP)

(72) Inventor: Megumi Hata, Nagakute (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 235 days.

(21) Appl. No.: 18/496,441

(22) Filed: Oct. 27, 2023

(65) Prior Publication Data
US 2024/0168621 A1 May 23, 2024

(30) Foreign Application Priority Data
Nov. 18, 2022 (JP) ................. 2022-184789

(51) Int. Cl.
G06F 3/048 (2013.01)
G06F 3/04847 (2022.01)
G06K 15/00 (2006.01)

(52) U.S. Cl.
CPC ....... *G06F 3/04847* (2013.01); *G06K 15/002* (2013.01)

(58) Field of Classification Search
None
See application file for complete search history.

(56) References Cited

U.S. PATENT DOCUMENTS

| | | |
|---|---|---|
| 2018/0199201 A1 | 7/2018 | Tsuda et al. |
| 2019/0026055 A1 | 1/2019 | Nishida |
| 2020/0012423 A1* | 1/2020 | Cinek ................. H04W 68/005 |
| 2021/0012392 A1 | 1/2021 | Kasahara et al. |
| 2021/0316219 A1 | 10/2021 | Kurabayashi |
| 2022/0036674 A1 | 2/2022 | Harada et al. |
| 2023/0074632 A1* | 3/2023 | Kimura .............. H04L 12/2807 |
| 2023/0164103 A1* | 5/2023 | Ham ................. H04M 1/72403 709/207 |

FOREIGN PATENT DOCUMENTS

| | | |
|---|---|---|
| JP | 2018-113578 A | 7/2018 |
| JP | 2019-021054 A | 2/2019 |
| JP | 2020-057946 A | 4/2020 |
| JP | 2020-103877 A | 7/2020 |
| JP | 2020-144633 A | 9/2020 |

* cited by examiner

*Primary Examiner* — Tuan S Nguyen
(74) *Attorney, Agent, or Firm* — Kenealy Vaidya LLP

(57) ABSTRACT

A terminal device may display a setting screen on a display unit of the terminal device, the setting screen being for setting whether to enable a notification related to a target device used by a user of the terminal device. The setting screen may include a first selective object for selecting whether to enable a first-type notification for which user-related information related to the user is not used; and a second selective object for selecting whether to enable a second-type notification for which the user-related information is used.

20 Claims, 9 Drawing Sheets

FIG. 2

User Table 210

| User ID | Token | Permission Flag | Printer ID |
|---|---|---|---|
| U1 | T1 | YES | P1 |
| U2 | T2 | NO | P2 |
| U3 | T3 | YES | P3 |

Printer Table 215

| Printer ID | Model Name | CTG Model Number | Remaining Amount | Date and Time of Service Subscription |
|---|---|---|---|---|
| P1 | AAA | C1 | 15% | 2022/10/15 3:23pm |
| P2 | BBB | C2 | 80% | 2022/9/10 10:50am |
| P3 | CCC | C3 | 100% | 2022/11/20 9:38pm |

Notification Table 220

| Notification ID | Message | Means | Trigger | Model Name | Operation |
|---|---|---|---|---|---|
| N1 | X'mas Campaign | Pull | 2022/11/1 7:00pm | - | Access URL1 |
| N2 | New Year Campaign | Push | 2022/12/1 7:00pm | - | Access URL2 |
| N3 | Buy Cartridge! | Push | Remaining Amount of 20% or Less | AAA, BBB | Display Purchase Screen |
| N4 | Thank you for starting XXX service | Push | Service Subscription | - | Start Application |
| N5 | Thank you for using application for 1 year | Pull | One Year from Start of Use | CCC | Access URL3 |

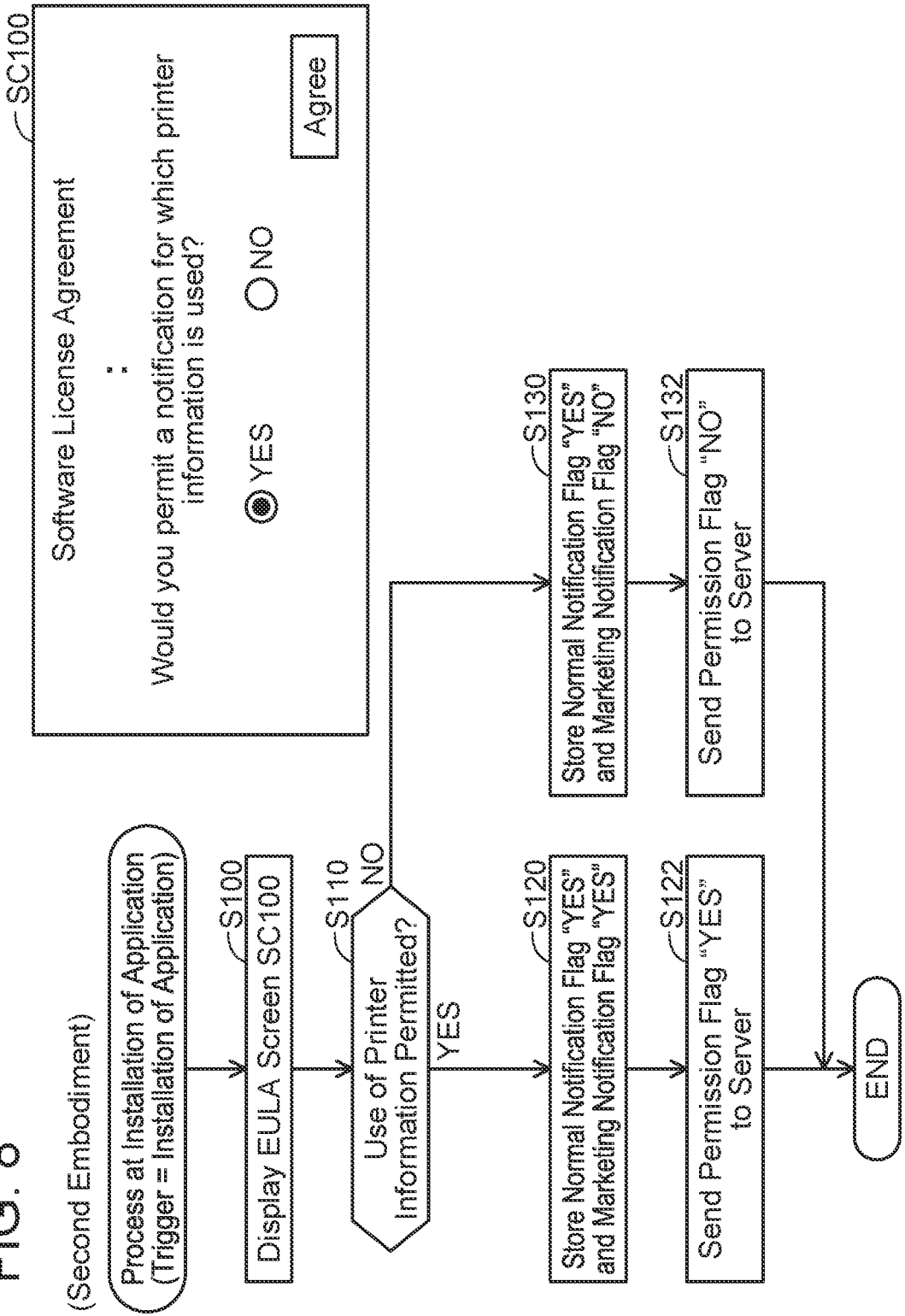

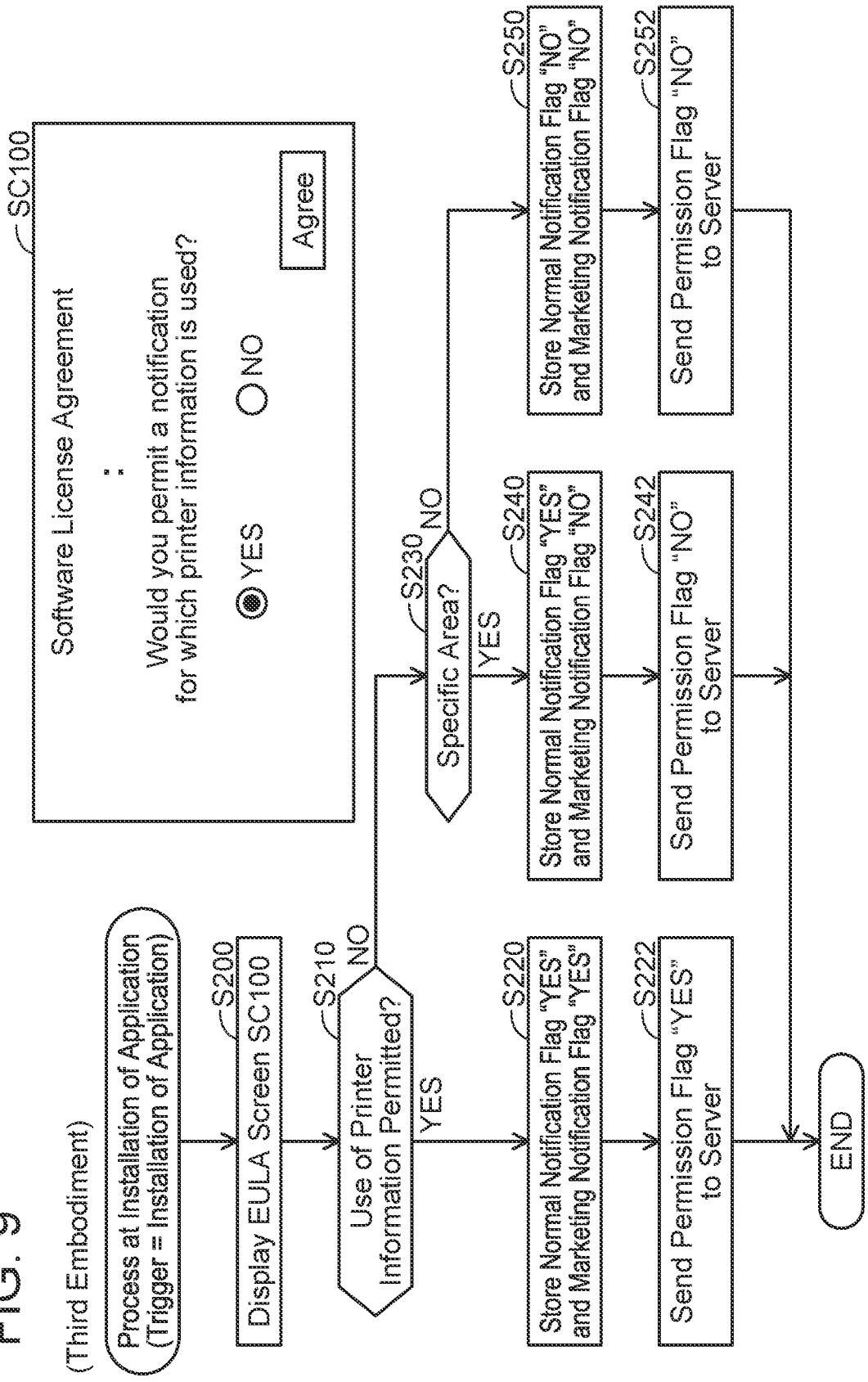

NON-TRANSITORY COMPUTER-READABLE RECORDING MEDIUM STORING COMPUTER-READABLE INSTRUCTIONS FOR TERMINAL DEVICE, TERMINAL DEVICE, AND CONTROL METHOD FOR TERMINAL DEVICE

REFERENCE TO RELATED APPLICATIONS

This application claims priority from Japanese Patent Application No. 2022-184789 filed on Nov. 18, 2022. The entire content of the priority application is incorporated herein by reference.

BACKGROUND ART

An advertisement distribution system is known. In this system, an information processing terminal displays a simple advertisement window when receiving a push notification from a server device.

DESCRIPTION

The disclosure herein provides a technology to improve user convenience.

Disclosed herein is a non-transitory computer-readable recording medium storing computer-readable instructions for a terminal device. The computer-readable instructions, when executed by a processor of the terminal device, may cause the terminal device to: display a setting screen on a display unit of the terminal device, the setting screen being for setting whether to enable a notification related to a target device used by a user of the terminal device. The setting screen may comprise a first selective object for selecting whether to enable a first-type notification for which user-related information related to the user is not used; and a second selective object for selecting whether to enable a second-type notification for which the user-related information is used.

The above configuration allows the user to select whether or not to enable the first-type notification for which the user-related information is not used, and also select whether or not to enable the second-type notification for which the user-related information is used. Notifications are executed according to the user's intention, and thus user convenience is improved.

A terminal device implemented by the computer-readable instructions stored in the above non-transitory computer-readable recording medium and a method carried out by the terminal device are also novel and useful.

FIG. 2 is examples of tables.

FIG. 8 is a flowchart of a process executed by the terminal device at install according to a second embodiment.

FIG. 9 is a flowchart of a process executed by the terminal device at install according to a third embodiment.

FIRST EMBODIMENT

Figure 1:
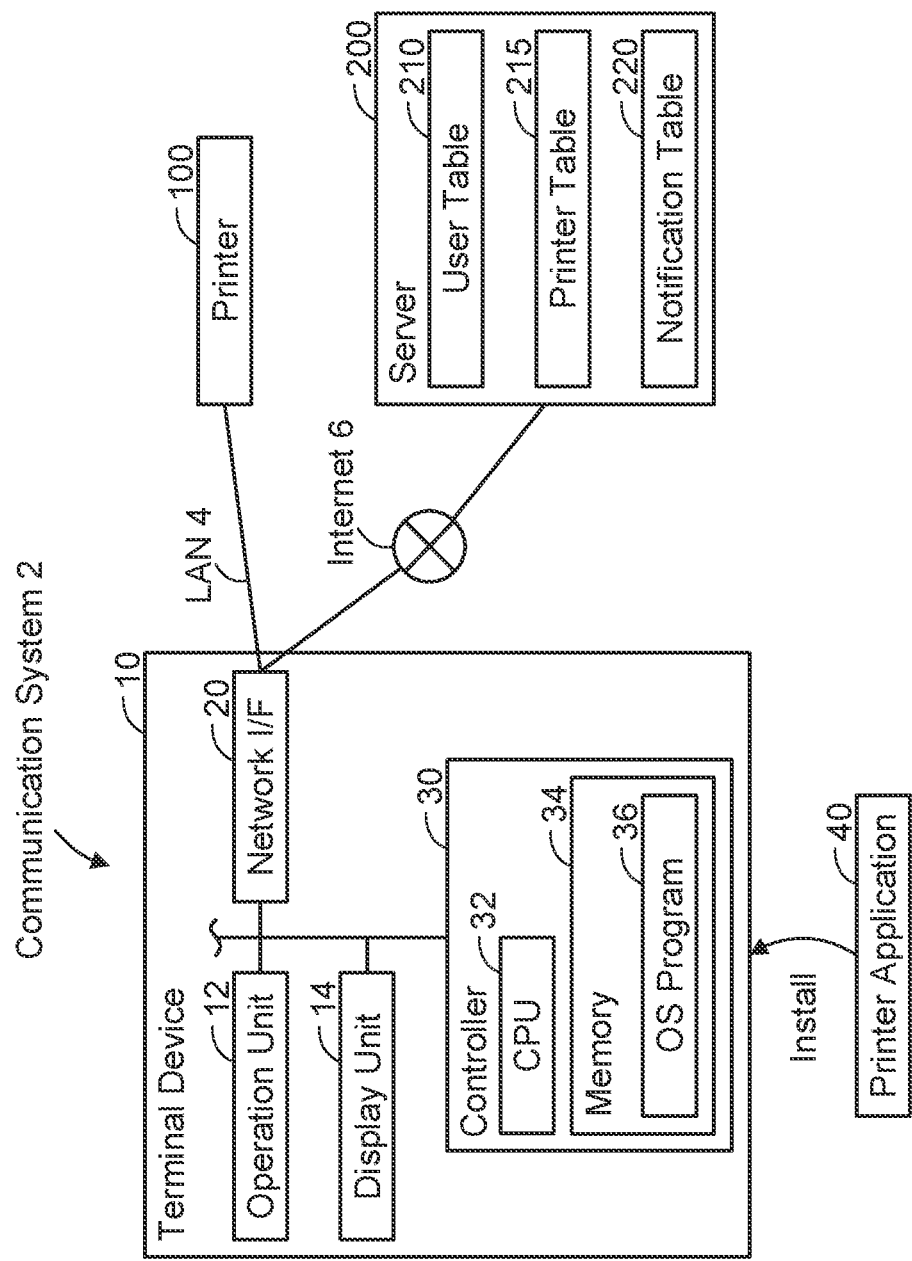
FIG. 1 is a schematic diagram of a communication system.

Configuration of Communication System 2: FIG. 1

As shown in FIG. 1, a communication system 2 comprises a terminal device 10, a printer 100, and a server 200. The terminal device 10 and the printer 100 can communicate with each other via a LAN 4. The server 200 is installed on the internet 6. The terminal device 10 can communicate with the server 200 via the internet 6.

Configuration of Terminal Device 10

The terminal device 10 is a portable terminal device such as a smartphone, tablet PC, or laptop PC. In a modification, the terminal device 10 may be a stationary terminal device such as a desktop PC. The terminal device 10 comprises an operation unit 12, a display unit 14, a network interface 20, and a controller 30. The units 12 to 30 are connected to a bus line.

The operation unit 12 is an interface for inputting various information into the terminal device 10 and includes a mouse, keyboard, etc. The display unit 14 is a display for displaying various information. The network interface 20 is connected to the LAN 4. The LAN 4 may be a wired LAN or a wireless LAN.

The controller 30 includes a CPU 32 and a memory 34. The CPU 32 executes various processes according to a program 36, etc. stored in the memory 34. The memory 34 is configured of a read only memory (ROM), a random access memory (RAM), etc. The memory 34 stores an OS program 36.

The OS program 36 is a program for controlling basic operations of the terminal device 10. A printer application 40 can be installed on the terminal device 10. The printer application 40 is a program for causing the printer 100 to execute printing and for displaying notifications related to the printer 100. Hereinafter, the OS program 36 is referred to as "OS 36" and the printer application 40 is referred to as "app 40".

Configuration of Server 200

The server 200 manages pieces of information about users of multiple printers including the printer 100 and pieces of information about the printers used by the users. The server 200 also sends notification information to multiple terminal devices to cause the terminal devices to display notifications related to the printers. The server 200 may be a physical server, or a virtual server on the cloud, a virtual machine, etc. The server 200 may be a single server or a collection of multiple servers. The server 200 may be a server on an intranet or a cloud server on the internet 6.

The server 200 stores a user table 210, a printer table 215, and a notification table 220. Referring to FIG. 2, contents in each of the tables 210, 215, and 220 are described below.

Contents of User Table 210

In the user table 210, users ID are each stored in association with a corresponding token, permission flag, and printer ID. Each user ID is information for identifying a user. The token is authentication information assigned to a printer application in a terminal device used by the user corresponding to the associated user ID. Hereinafter, this terminal device is referred to as "target terminal device". The permission flag is information indicating whether marketing notifications from the server 200 are to be enabled or not in the target terminal device. The permission flag indicates either "YES", meaning that marketing notifications are to be enabled, or "NO", meaning that marketing notifications are not to be enabled. Printer information is an example of user-related information and includes, for example, a printer ID, model name of the printer, model number of a color material cartridge (CTG) currently mounted in the printer, and remaining amount of color material (e.g., ink, toner) in the color material CTG. The printer ID is information for identifying a printer used by the user corresponding to the associated user ID.

Contents of Printer Table 215

In the printer table 215, printer IDs are each stored in association with a corresponding model name, CTG model number, remaining amount, and service subscription date and time. The model name is information for identifying a printer identified by the associated printer ID. Hereinafter, this printer is referred to as "target printer". The CTG model number and remaining amount are the model number of a color material CTG currently mounted in the target printer and a remaining amount of color material in the color material CTG, respectively. The service subscription date and time is the date and time when the target printer started receiving a predetermined service for the target printer. The predetermined service is, for example, a service of automatically shipping color material CTGs, a service of allowing users to use the printer at a fixed rate up to the upper limit of sheets, or the like.

Contents of Notification Table 220

The notification table 220 stores various notification information. Each notification includes a notification ID, message, means, trigger, model name, and operation information which are associated with each other. The notification ID is information for identifying the notification information. The message is a character string written in a banner to be displayed at a terminal device. The means is a means of sending the notification information and can be either pull notification or push notification. Pull notification is a notification that is sent to a terminal device in response to receipt of a notification information sending request from the terminal device. Push notification is a notification that is sent to a terminal device without receipt of a notification information sending request from the terminal device. The trigger indicates a condition for displaying a banner including the associated message. Hereinafter, this banner is referred to as "target banner". The model name indicates model name(s) of printer(s) at which the target banner is to be displayed. The operation information indicates an operation to be performed by a terminal device when the target banner is selected.

Figure 3:
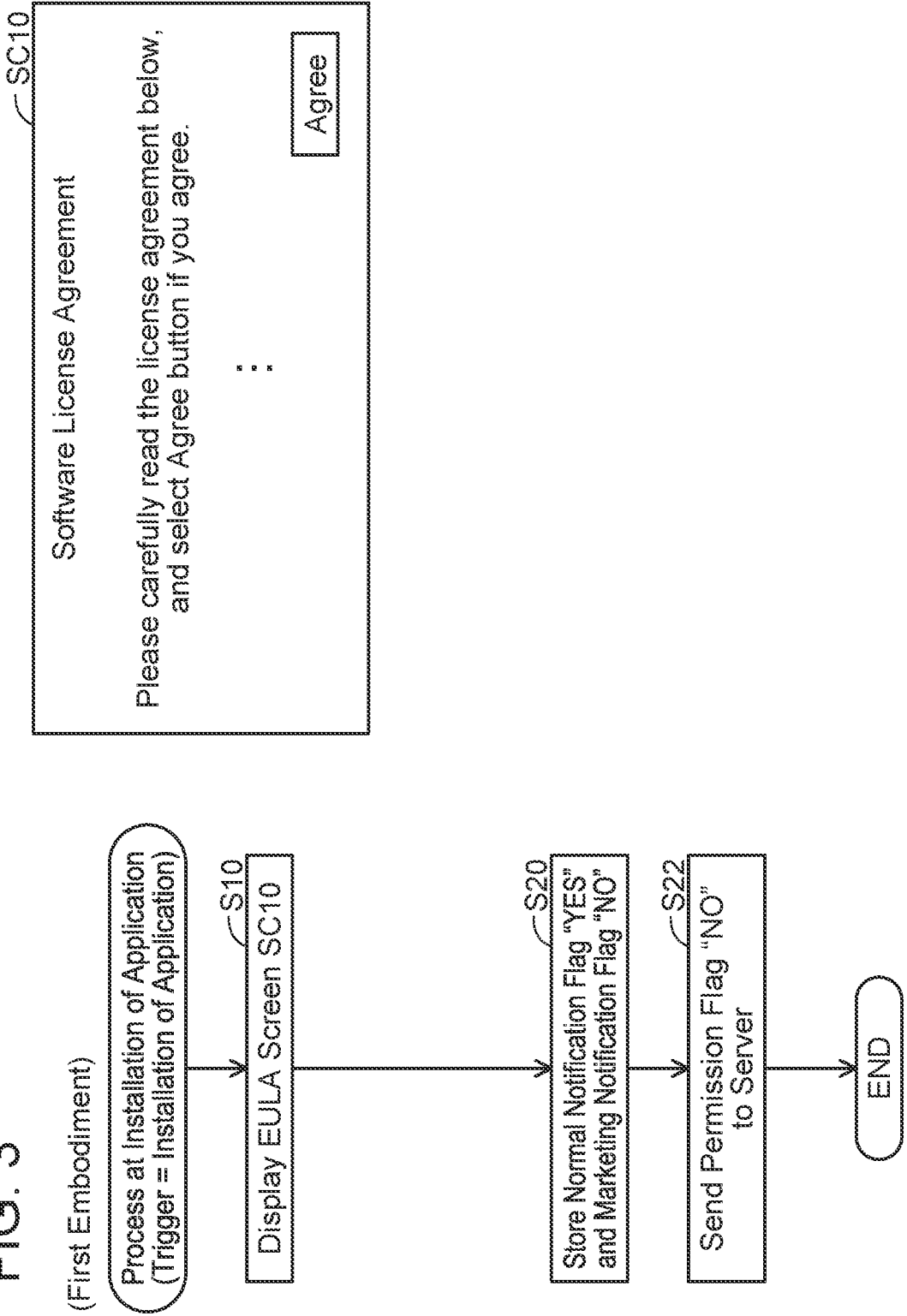
FIG. 3 is a flowchart of a process executed by a terminal device at install according to a first embodiment.

Process at Install by App 40: FIG. 3

Referring to FIG. 3, a process executed by the app 40 when the app 40 is installed on the terminal device 10 is described. Hereinafter, this process is explained with the app 40 as the subject of actions, not with the CPU 32 of the terminal device 10 as the subject of actions. The app 40 executes various processes by accessing the hardware such as the CPU, the display unit 14, the memory 34, and the network interface 20 through the OS 36. However, hereinafter, the fact that the app 40 executes processes through the OS 36 may be omitted as appropriate.

In S10, the app 40 displays an EULA screen SC10 on the display unit 14. EULA is an abbreviation for end user license agreement. The EULA screen SC10 includes terms of a software license agreement and an Agree button. The app 40 proceeds to S20 in response to the user selecting the Agree button.

In S20, the app 40 stores a normal notification flag "YES" and a marketing notification flag "NO" in the memory 34. The normal notification flag is a notification indicating whether normal notifications are to be enabled or not, and indicates either "YES", meaning that normal notifications are to be enabled, or "NO", meaning that normal notifications are not to be enabled. The normal notifications are notifications for which printer information stored in the server 200 are not used by the server 200. The marketing notification flag is a notification indicating whether marketing notifications are to be enabled or not, and indicates either "YES", meaning that marketing notifications are to be enabled, or "NO", meaning that marketing notifications are not to be enabled. The marketing notifications are notifications for which printer information stored in the server 200 are used by the server 200. In the present embodiment, "a notification is enabled" may mean that a notification is permitted, that receipt of a notification is agreed, or that receipt of a notification is accepted.

In S22, the app 40 sends permission flag "NO" to the server 200. Along with this, the app 40 also sends a user ID and a token to the server 200. This user ID is registered in the app 40 by the user when the app 40 is installed. This token is assigned to the app 40 by a predetermined server when the app 40 is installed. This predetermined server is a server managed by the business operator that provides the OS 36.

When receiving the user ID, the token, and the permission flag "NO" from the terminal device 10, the server 200 stores these information in the user table 210 in association with each other. At this point, no printer ID is stored in association with those information. By using the token, the server 200 can send notification information to the terminal device 10 without receiving a request from the terminal device 10. That is, the token is authentication information used to cause the terminal device 10 to execute a push notification. When S22 is completed, the process of FIG. 3 ends.

As described above, the app 40 adopts "YES" as the default value for the normal notification flag when the app 40 is installed. This ensures that normal notifications are properly provided to the user. On the other hand, the app 40 adopts "NO" as the default value for the marketing notification flag. This prevents marketing notifications from being provided to the user before the user permits use of printer information.

Printer Registration Process by App 40

Although a flowchart is omitted, the app 40 can find the printer 100 by executing a search through the LAN 4. The app 40 then registers information about the printer 100, as a printer capable of executing printing, in the memory 34 according to an instruction from the user. At this time, the app 40 receives the printer ID and model name of the printer 100 from the printer 100 and registers these information in the memory 34. Hereinafter, the printer 100 registered as above by the app 40 may be referred to as "registered printer". The app 40 then sends the user ID and the printer ID to the server 200. As a result, the printer ID is stored in association with the user ID in the user table 210 of the server 200.

Thereafter, the user of the terminal device 10 can make the printer 100 communicable with the server 200 by operating the printer 100. The printer 100 sends its printer ID, model name, CTG model number, and color material remaining amount to the server 200. As a result, these information are stored in association with each other in the printer table 215 of the server 200. The server 200 periodically communicates with the printer 100 and updates the color material remaining amount in the printer table 215 each time the server 200 receives a color material remaining amount from the printer 100. Thus, the server 200 stores, for each user, information about the registered printer used by the user. The user may make the printer 100 communicable with the server 200 by operating the app 40 instead of by operating the printer 100.

The user can also subscribe to the predetermined service described above by operating the printer 100. The printer 100 sends its printer ID and service subscription date and time to the server 200. As a result, the service subscription date and time is stored in association with the printer ID in the printer table 215 of the server 200. The server 200 updates information in the printer table 215 by communicating with various other printers in the same way. The user may subscribe to the predetermined service described above by operating the app 40 instead of by operating the printer 100.

Figure 4:
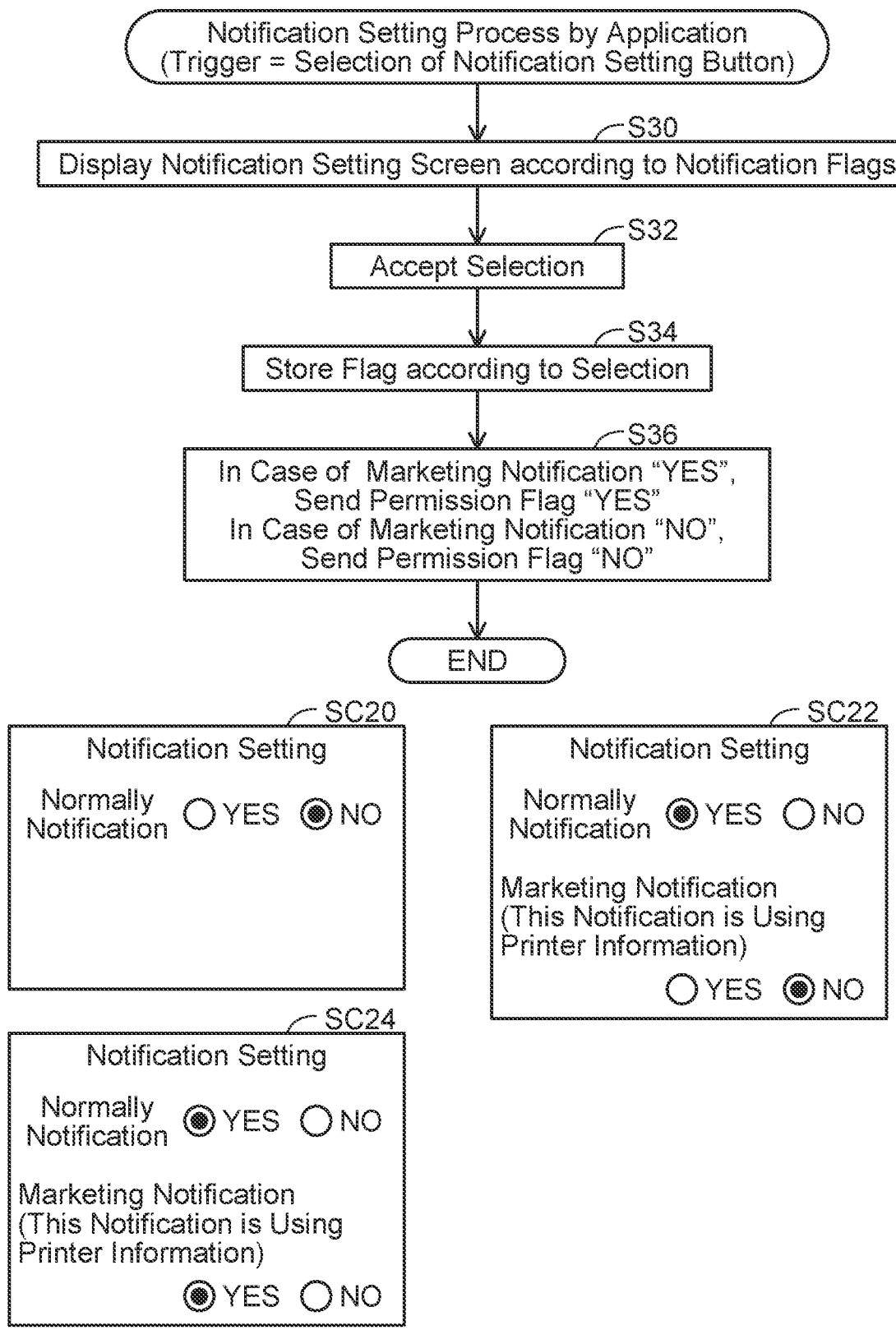
FIG. 4 is a flowchart of a notification setting process executed by the terminal device.

Notification Setting Process by App 40: FIG. 4

Referring to FIG. 4, a notification setting process executed by the app 40 is described. This process is triggered by a notification setting button in a screen displayed by the app 40 being selected.

In S30, the app 40 displays a notification setting screen according to the current normal notification flag and marketing notification flag on the display unit 14. For example, if the normal notification flag "NO" and the marketing notification flag "NO" are stored in the memory 34, the app 40 displays a notification setting screen SC20. The notification setting screen SC20 includes a normal notification object for selecting whether or not to enable normal notifications. This object indicates the current normal notification flag "NO". The notification setting screen SC20 does not include a marketing notification object for selecting whether or not to enable marketing notifications. This is because when the user does not wish to receive normal notifications, he/she usually does not wish to receive marketing notifications either. The app 40 thus does not display the unnecessary object.

For example, if the normal notification flag "YES" and the marketing notification flag "NO" are stored in the memory 34 (e.g., in the default state of S20 in FIG. 3), the app 40 displays a notification setting screen SC22. The notification setting screen SC22 includes the normal notification object indicating the normal notification flag "YES" and the marketing notification object indicating the marketing notification flag "NO". The marketing notification object includes a character string indicating that printer information is used for marketing notifications. This allows the user to know that he/she can select whether or not to enable the notifications for which printer information, which is an example of user-related information, are used.

For example, if the normal notification flag "YES" and the marketing notification flag "YES" are stored in the memory 34, the app 40 displays a notification setting screen SC24. The notification setting screen SC24 includes the normal notification object indicating the normal notification flag "YES" and the marketing notification object indicating the marketing notification flag "YES".

In S32, the app 40 accepts user's selections at the respective objects in the notification setting screen. Here, the app 40 switches notification setting screens according to the user's selections. For example, if the normal notification object in the notification setting screen SC20 is changed from "NO" to "YES", the app 40 displays the notification setting screen SC22 instead of the notification setting screen SC20. Also, for example, if the normal notification object in the notification setting screen SC22 is changed from "YES" to "NO", the app 40 displays the notification setting screen SC20 instead of the notification setting screen SC22.

In S34, the app 40 stores, in the memory 34, the normal notification flag and the marketing notification flag according to the selections at the respective objects in the notification setting screen.

In S36, the app 40 sends the user ID and permission flag "YES" to the server 200 if the marketing notification flag "YES" was stored, whereas the app 40 sends the user ID and permission flag "NO" to the server 200 if the marketing notification flag "NO" was stored. As a result, the permission flag associated with the user ID is updated in the user table 210 of the server 200.

Figure 5:
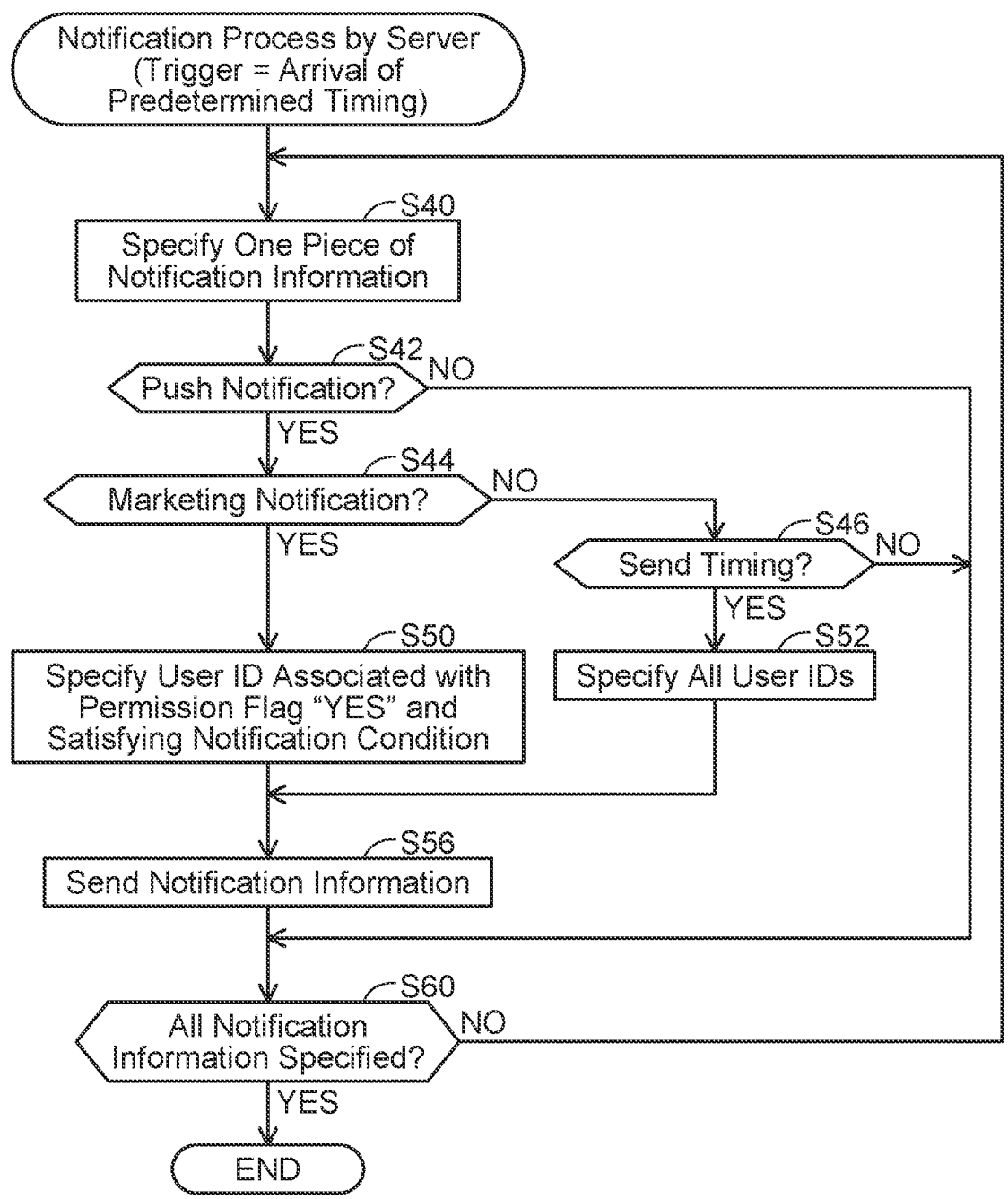
FIG. 5 is a flowchart of a notification process executed by a server.

Notification Process by Server 200: FIG. 5

Referring to FIG. 5, a notification process executed by the server 200 is described. This process is triggered by the arrival of a predetermined timing. This predetermined timing is, for example, a predetermined time of day.

In S40, the server 200 specifies one piece of notification information in the notification table 220. Hereinafter, this notification information is referred to as "target notification information".

In S42, the server 200 determines whether the target notification information corresponds to a push notification or a pull notification. If the means in the target notification information indicates push notification, the server 200 determines YES in S42 and proceeds to S44. If the means in the target notification information indicates pull notification, the server 200 determines NO in S42 and proceeds to S60.

In S44, the server 200 determines whether the target notification information corresponds to a marketing notification. If (1) the trigger in the target notification information indicates a consumable article remaining amount, (2) the trigger in the target notification information indicates subscription to a service, or (3) the target notification information includes a real model name, the server 200 determines YES in S44 and proceeds to S50. For example, in the notification table 220 shown in FIG. 2, notification information with a notification ID "N3" and notification information with a notification ID "N4" correspond to marketing notifications. Notification information with a notification ID "N2" does not correspond to a marketing notification but corresponds to a normal notification. If the target notification information does not correspond to any of the above cases (1) to (3), the server 200 determines NO in S44 and proceeds to S46. In a modification, the server 200 may also determine YES in S44 if (4) the target notification information includes a real CTG model number.

In S50, the server 200 specifies in the user table 210 all user IDs that are associated with the permission flag "YES" and satisfy the conditions as destinations of the target notification information. Specifically, the server 200 first specifies M user IDs (M is an integer greater than or equal to 1) associated with the permission flag "YES". The server 200 then specifies one user ID out of the M user IDs and specifies the printer ID associated with this user ID in the user table 210. Hereafter, these user ID and printer ID are referred to as "target user ID" and "target printer ID", respectively. The server 200 specifies the model name, CTG model number, remaining amount, and service subscription date and time associated with the target printer ID in the printer table 215. If the specified model name, etc. match the trigger and the model name in the target notification information, the server 200 specifies the target user ID as a destination of the target notification information.

For example, assuming that the notification information with the notification ID "N3" in the notification table 220 shown in FIG. 2 is the target notification information. In this case, when the model name associated with the target printer ID is "AAA" or "BBB" and the remaining amount associated with the target printer ID is 20% or less, the server 200 specifies the target user ID as a destination of the target notification information. Here, "when the remaining amount is 20% or less" means, more specifically, that the previous remaining amount was more than 20% and the current remaining amount is 20% or less. Also, for example, assuming that the notification information with the notification ID "N4" is the target notification information. In this case, the server 200 specifies the target user ID as a destination of the target notification information when the service subscription date and time associated with the target printer ID is between the date and time when the notification setting process was executed previously and the date and time when the notification setting process was executed this time.

The server 200 executes the same process as the one described above for each of the M user IDs to specify all user ID to be destinations of the target notification information. Since the server 200 specifies the user IDs associated with the permission flag "YES" as the destinations of the target notification information in S50, the server 200 can send the target notification information only to terminal devices for which marketing notifications are enabled. Thus, the server 200 can switch whether or not to send the target notification information to terminal devices according to the user's intention. Further, the server 200 specifies user IDs that satisfy the conditions as the destinations of the target notification information. Thus, the server 200 can prevent unnecessary notification information from being sent to terminal devices used by users identified by user IDs that do not satisfy the conditions. When S50 is completed, the server 200 proceeds to S56.

In S46, the server 200 determines whether or not the sending timing for the target notification information has arrived. Specifically, if the trigger in the target notification information indicates a date and time, the server 200 determines whether or not the current date and time is past that date and time. For example, assuming that the notification information with the notification ID "N2" in the notification table 220 shown in FIG. 2 is the target notification information. In this case, when the current date and time is past 7:00 pm on Dec. 1, 2022, the server 200 determines that the sending timing for the target notification information has arrived (YES in S46). When the trigger in the target notification information does not indicate a date and time or when the trigger indicates a date and time but the current date and time is not past that date and time, the server 200 determines that the sending timing for the target notification information has not arrived yet (NO in S46). The server 200 proceeds to S52 if determining YES in S46, while the server 200 proceeds to S60 if determining NO in S46.

In S52, the server 200 specifies all user IDs in the user table 210 as destinations of the target notification information. When S52 is completed, the server 200 proceeds to S56.

In S56, the server 200 sends the target notification information to terminal devices. Specifically, the server 200 specifies in the user table 210 all tokens that are associated with the user IDs specified in S50 or S52. For each of these user IDs, the server 200 sends the user ID, the specified token, and the target notification information. The destinations here depend on the OSs of the terminal devices. For example, if the OS 36 of the terminal device 10 is a specific OS, the destination is a server (not shown) managed by the vendor of that specific OS. The target notification information is thus sent to the terminal device 10 via that server.

The server 200 deletes the target notification information sent via YES in S46 from the notification table 220. This prevents the same notification information from being sent again to the same terminal devices. Among notification information that are determined NO in S44, some may correspond to the sending timing condition (i.e., the condition in S46) and some correspond to other conditions (e.g., color material remaining amount). The server 200 may delete the notification information corresponding to the sending timing condition from the notification table 220 after the notification information has been sent, and may not delete the notification information corresponding to the other conditions from the notification table 220 even after the notification information has been sent. The latter notification information may be deleted, for example, after notification validity period has expired.

In S60, the server 200 determines whether all of the notification information in the notification table 220 have already been specified in S40. If determining that there are still one or more pieces of notification information that have not been specified yet (NO in S60), the server 200 returns to S40 and specifies another piece of notification information. If determining that all of the notification information have already been specified (YES in S60), the server 200 terminates the process of FIG. 5.

Even in the case of YES in S44 (i.e., in case of a marketing notification), there may be a notification that is limited to a specific model name and is sent on a specific date and time (i.e., at a specific sending timing). If such a marketing notification is the target, the server 200 specifies all user IDs that satisfy the specific model name and the sending timing condition in S50.

Figure 6:
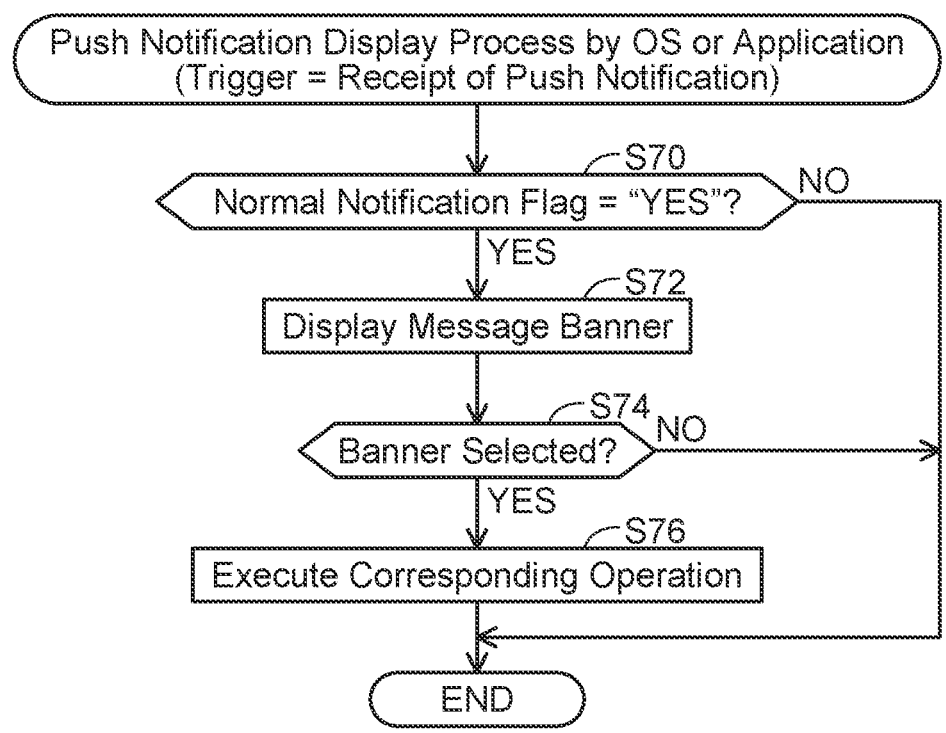
FIG. 6 is a flowchart of a push notification display process executed by the terminal device.

Push Notification Display Process by OS 36 or App 40: FIG. 6

Referring to FIG. 6, a push notification display process executed by the OS 36 or the app 40 is described. The process is triggered by receipt of notification information corresponding to a push notification from the server 200. Hereinafter, this notification information is referred to as "target notification information". When the target notification information is received while the app 40 is not running, the OS 36 supplies the app 40 with information indicating that the target notification information has been received. As a result, the app 40 executes the process of FIG. 6 in the background. When the target notification information is received while the app 40 is running, the app 40 executes the process of FIG. 6 in the foreground.

In S70, the OS 36 or the app 40 determines whether the normal notification flag "YES" is stored in the memory 34. If the normal notification flag "YES" is stored (YES in S70), the OS 36 or the app 40 proceeds to S72, whereas if the normal notification flag "NO" is stored (NO in S70), the process of FIG. 6 is terminated.

In S72, the OS 36 or the app 40 displays a message banner indicating the message included in the target notification information on the display unit 14. The push notification is thus provided to the user.

In S74, the OS 36 or the app 40 determines whether the message banner displayed in S72 has been selected by the user. If the message banner has been selected (YES in S74), the OS 36 or the app 40 proceeds to S76, whereas if the message banner has not been selected (NO in S74), the process of FIG. 6 is terminated.

In S76, the OS 36 or the app 40 executes the operation indicated by the operation information included in the target notification information. For example, assuming that the notification information with the notification ID "N2" in the notification table 220 shown in FIG. 2 is the target notification information. In this case, the OS 36 or the app 40 executes an operation to access a URL2. For example, the OS 36 or the app 40 supplies the URL2 to a web browser, which is not shown, and causes the web browser to access the URL2. For example, assuming that the notification information with the notification ID "N3" in the notification table 220 shown in FIG. 2 is the target notification information. In this case, the OS 36 or the app 40 displays a purchase screen for purchasing color material CTGs on the display unit 14. When S76 is completed, the process of FIG. 6 ends.

Figure 7:
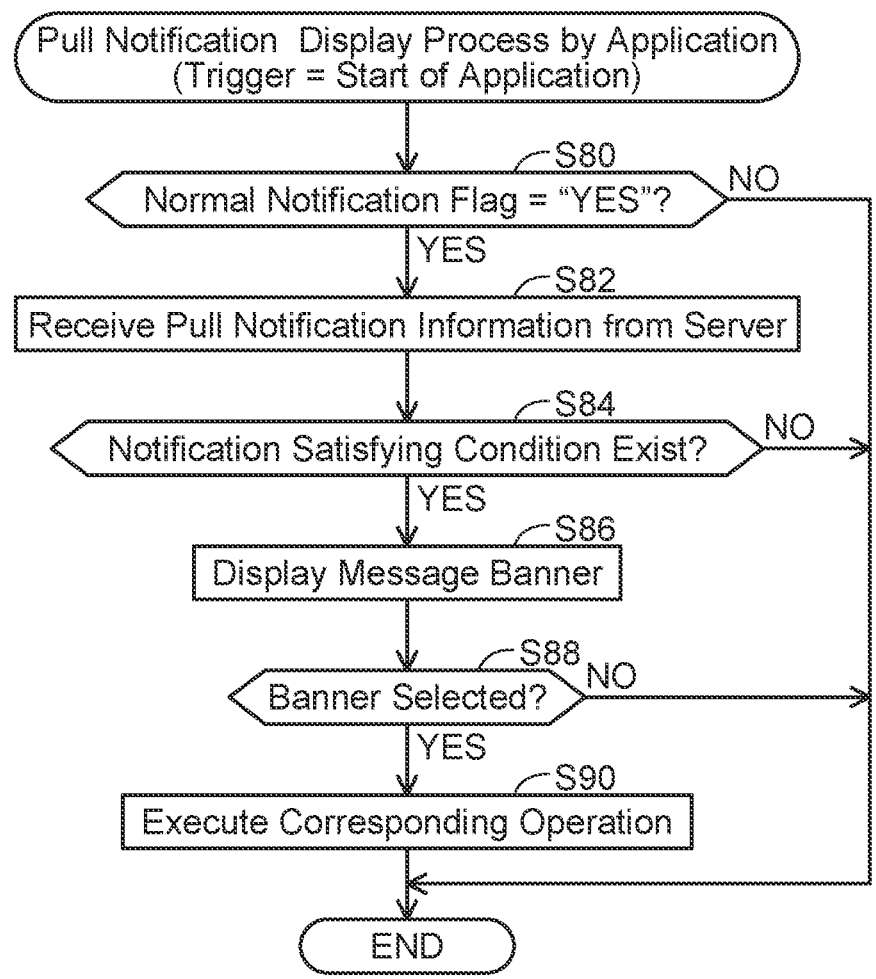
FIG. 7 is a flowchart of a pull notification display process executed by the terminal device.

Pull Notification Display Process by App 40: FIG. 7

Referring to FIG. 7, a pull notification display process executed by the app 40 is described. This process is triggered by the start of the app 40.

In S80, the app 40 determines whether the normal notification flag "YES" is stored in the memory 34. If the normal notification flag "YES" is stored (YES in S80), the app 40 proceeds to S82, whereas if the normal notification flag "NO" is stored (NO in S80), the process of FIG. 7 is terminated.

In S82, the app 40 sends the server 200 a request that requests notification information corresponding to pull notifications (hereinafter referred to as "pull notification information") to be sent and then receives pull notification information from the server 200. Here, the app 40 receives all pull notification information stored in the server 200, regardless of their triggers and model names.

In S84, the app 40 determines whether there is pull notification information that satisfies its condition among all the pull notification information received in S82. For example, in the notification table 220 shown in FIG. 2, the pull notification information with the notification ID "N1" includes a trigger indicating a date and time. In this case, the app 40 determines that the pull notification information satisfies its condition when the current date and time is past that date and time. The pull notification information with the notification ID "N5" includes a trigger indicating elapse of one year since the start of use and a model name indicating "CCC". In this case, the app 40 determines that the pull notification information satisfies its condition when one year has passed since the start of use of the app 40 and the model name of the registered printer is "CCC". If there are one or more pieces of pull notification information that satisfy their conditions (YES in S84), the app 40 proceeds to S86, whereas if there are no pull notification information that satisfy their conditions (NO in S84), the process of FIG. 7 is terminated.

In S86, the app 40 sequentially displays, on the display unit 14, message banners indicating the respective messages included in all the pull notification information that satisfy their conditions. The pull notifications are thus provided to the user. S88 and S90 are the same as S74 and S76 in FIG. 6, respectively. As described above, since the app 40 displays only the pull notifications according to the pull notification information that satisfy their conditions, provision of unnecessary notifications to the user can be suppressed.

In the process of FIG. 7, the app 40 does not change the process depending on the marketing notification flag. This is because marketing notifications are notifications for which the printer information stored in the server 200 are used by the server 200 but not notifications for which the printer information are used by the app 40. For example, at first glance, the pull notification information with the notification ID "N5" in the notification table 220 appears to correspond to a marketing notification. However, since printer information is not used by the server 200 for it, the pull notification information can be said to correspond to a normal notification. That is, in the notification table 220, the notification information with the notification IDs "N1", "N2", and "N5" correspond to normal notifications, and the notification information with the notification IDs "N3" and "N4" correspond to marketing notifications. In a modification, the app 40 may change the process depending on the marketing notification flag. That is, the app 40 may, for example, display a pull notification corresponding to the pull notification information with the notification ID "N5" if the marketing notification flag is "YES", whereas the app 40 may not display the pull notification if the marketing notification flag is "NO".

Effects of First Embodiment

According to the present embodiment, the user can select whether or not to enable normal notifications for which printer information, which is an example of user-related information, are not used, and also select whether or not to enable marketing notifications for which printer information are used, in the notification setting screens SC20 to S24 in FIG. 4. This allows the notifications to be executed according to the user's intention, and thus user convenience is improved.

Correspondence Relationships

The notification setting screens SC20 to S24 are examples of "setting screen". The normal notification and marketing notification are examples of "first-type notification" and "second-type notification", respectively. "YES" and "NO" of the normal notification flag are examples of "first setting value" and "second setting value", respectively. "YES" and "NO" of the marketing notification flag are examples of "third setting value" and "fourth setting value", respectively. S30, S34, and S36 in FIG. 4 are examples of "display a setting screen", "store a setting value according to a selection result", and "send result information", respectively. S20 in FIG. 3 is an example of "store a setting value in a memory of the terminal device when the computer-readable instructions are installed in the terminal device".

Second Embodiment: FIG. 8

Next, a second embodiment is described. This embodiment is the same as the first embodiment, except that a process in FIG. 8 is executed instead of the process in FIG. 3.

In S100, the app 40 displays an EULA screen SC100 on the display unit 14. The EULA screen includes a selective object for selecting whether or not to permit notifications for which printer information are used. In response to selection of an Agree button after selection of "YES" or "NO" at the selective object, the app 40 proceeds to S110.

In S110, the app 40 determines whether notifications for which printer information are used were permitted on the EULA screen SC100. If "YES" was selected at the selective object, the app 40 determines that the notifications were permitted (YES in S110) and proceeds to S120. If "NO" was selected at the selective object, the app 40 determines that the notifications were not permitted (NO in S110) and proceeds to S130.

In S120, the app 40 stores the normal notification flag "YES" and the marketing notification flag "YES" in the memory 34. Then, in S122, the app 40 sends the permission flag "YES" to the server 200. When S122 is completed, the process of FIG. 8 ends.

In S130, the app 40 stores the normal notification flag "YES" and the marketing notification flag "NO" in the memory 34. Then, in S132, the app 40 sends the permission flag "NO" to the server 200. When S132 is completed, the process of FIG. 8 ends.

Effects of Second Embodiment

As described above, the app 40 adopts "YES" as the default value for the normal notification flag when the app 40 is installed (S120, S130). The app 40 then stores the marketing notification flag "YES" or "NO" according to the selection result at the selective object in the EULA screen SC100 (S120, S130) and sends the permission flag "YES" or "NO" to the server 200. This allows the server 200 to switch between executing and not executing marketing notifications according to the user's choice. In the present embodiment, the EULA screen SC100 is an example of "selection screen". S100 is an example of "display a selection screen".

Third Embodiment: FIG. 9

Next, a third embodiment is described. This embodiment is the same as the second embodiment, except that a process shown in FIG. 9 is executed instead of the process shown in FIG. 8.

S200, S210, S220, and S222 are the same as S100, S110, S120, and S122 in FIG. 8, respectively. When determining NO in S210, the app 40 proceeds to S230.

In S230, the app 40 determines whether a usage area, which is an area where the app 40 is used, is a predetermined specific area or not. The "specific area" may be, for example, a specific country or an area including multiple countries. When installed on the terminal device 10, the app 40 displays a screen for selection of a usage area and stores a usage area according to the selection result. If the stored usage area is the specific area (YES in S230), the app 40 proceeds to S240, whereas if the stored usage area is not the specific region (NO in S230 (e.g., Europe)), the app 40 proceeds to S250.

S240 and S242 are the same as S120 and S122 in FIG. 8, respectively. In S250, the app 40 stores the normal notification flag "NO" and the marketing notification flag "NO" in the memory 34. Then, in S252, the app 40 sends the permission flag "NO" to the server 200. When S252 is completed, the process of FIG. 9 ends.

Effects of Third Embodiment

As described above, when non-permission for the use of printer information is selected at the selective object in the EULA screen SC100 (NO in S210), the app 40 stores the normal notification flag "YES" or "NO" depending on the usage area of the app 40 (S240, S250). Thus, the app 40 can switch between executing or not executing notifications according to preferences, etc. regarding notifications in each area.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

Modification 1

In S20 of FIG. 3, the app 40 may store the normal notification flag "NO" and the marketing notification flag "NO" in the memory 34. Generally speaking, "store a setting value in a memory of the terminal device when the computer-readable instructions are installed in the terminal device" may not require the first setting value to be stored in the memory when the computer-readable instructions are installed in the terminal device.

Modification 2

The notification setting screen SC20 shown in FIG. 4 may include a marketing notification object having a display manner (e.g., in a grayed-out manner) that does not allow the selection on whether or not to enable marketing notifications. This modification is also an example of "the setting screen does not comprise the second selective object having the display manner that allows selection on whether to enable the second-type notification in a case where disablement of the first-type notification is selected at the first selective object". In the present modification, if enablement of normal notifications is selected in the notification setting screen SC20, the notification setting screen SC22 is displayed that includes a marketing notification object having a display manner that allows the selection. In another modification, the notification setting screen SC20 may include a marketing notification object having the display manner that allows the selection. Generally speaking, the "setting screen" may include the second selective object having the display manner that allows the selection on whether or not to enable the second-type notification in case where disablement of the first-type notification is selected at the first selective object.

Modification 3

In each of the above embodiments, for sending notification information corresponding to push notifications, the server 200 determines whether or not the push notifications are marketing notifications (S44 in FIG. 5), and if the push notifications are marketing notifications, specifies only user IDs that satisfy the conditions (S50). Alternatively, the server 200 may specify all user IDs (S50) and send notification information to all terminal devices corresponding to all the user IDs, regardless of whether the push notifications are marketing notifications or not. In this case, the terminal device 10 switches between displaying and not displaying the banners according to the marketing notification flag and the conditions in the notification information (i.e., trigger, model name, etc.). Generally speaking, filtering for whether a push notification as a marketing notification is displayed or not may be performed by the server 200 as in the embodiments above, or by the terminal device 10 as in this modification. In this modification, the terminal device 10 may not send the permission flag "YES" or "NO" to the server 200. That is, S22 in FIGS. 3 and S36 in FIG. 4 may be omitted, and generally speaking, "send result information" may be omitted. In another modification, the terminal device 10 may send the normal notification flag "YES" or "NO" to the server 200, and the server 200 may store the normal notification flag in association with a user ID. In this case, the server 200 may specify only user IDs associated with the normal notification flag "YES" in case where the push notifications are normal notifications. Generally speaking, filtering for whether a push notification as a normal notification is displayed or not may be performed by the terminal device 10 as in the embodiments above, or by the server 200 as in this modification.

Modification 4

In each of the above embodiments, in response to receiving the pull notification sending request from the terminal device 10, the server 200 sends all pull notification information corresponding to all pull notifications to the terminal device 10 without determining whether each pull notification is a marketing notification or not. The terminal device 10 then displays the banners according only to the pull notification information that satisfy the conditions. Alternatively, the server 200 may send only pull notification information that satisfy the conditions (i.e., trigger, model name, etc.) in the pull notification information to the terminal device 10. Generally speaking, filtering for whether a pull notification is displayed or not may be performed by the terminal device 10 as in the embodiments above, or by the server 200 as in this modification.

Modification 5

The terminal device 10 may not display notifications regarding the printer 100, but may display notifications regarding other devices such as a scanner, a multifunction device, a PC, a server, etc. Generally speaking, "target device" is not limited to a printing device, but include a variety of other devices.

Modification 6

The "user-related information" is not limited to printer information, but may include user information such as user's age and gender.

Modification 7

The "user-related information" may include only identification information of the printing device (e.g., printer ID), only the model name of the printing device, only the model number of consumable article (e.g., color material CTG), only information indicating a remaining amount of consumable article and whether or not the user is provided with the predetermined service, or a combination of two or more of these. The "user-related information" may include the number of printed sheets by the printing device, and generally speaking, may include any information about the operating history of the printing device.

Modification 8

In the above embodiments, the app 40 is a native app that is installed on the terminal device 10. Alternatively, the app 40 may be a cloud app, a web app, or a hybrid app.

Modification 9

In each of the above embodiments, each of the processes in FIGS. 3 to 9 is executed by software (e.g., the app 40), but at least one of these processes may be realized by hardware such as a logic circuit.

What is claimed is:

1. A non-transitory computer-readable recording medium storing computer-readable instructions for a terminal device, wherein the computer-readable instructions, when executed by a processor of the terminal device, cause the terminal device to:
display a setting screen on a display unit of the terminal device, the setting screen being for setting whether to enable a notification related to a target device used by a user of the terminal device,
wherein the setting screen comprises:
a first selective object for selecting whether to enable a first-type notification for which user-related information related to the user is not used; and
a second selective object for selecting whether to enable a second-type notification for which the user-related information is used.

2. The non-transitory computer-readable recording medium as in claim 1, wherein
the computer-readable instructions, when executed by the processor of the terminal device, further cause the terminal device to:
store a setting value according to a selection result on the setting screen in a memory of the terminal device,
wherein either a first setting value indicating that the first-type notification is to be enabled or a second setting value indicating that the first-type notification is not to be enabled is stored in the memory, and
either a third setting value indicating that the second-type notification is to be enabled or a fourth setting value indicating that the second-type notification is not to be enabled is stored in the memory.

3. The non-transitory computer-readable recording medium as in claim 1, wherein
the computer-readable instructions, when executed by the processor of the terminal device, further cause the terminal device to:
store a setting value in a memory of the terminal device when the computer-readable instructions are installed in the terminal device,
wherein either a first setting value indicating that the first-type notification is to be enabled or a second setting value indicating that the first-type notification is not to be enabled is stored in the memory, and
either a third setting value indicating that the second-type notification is to be enabled or a fourth setting value indicating that the second-type notification is not to be enabled is stored in the memory.

4. The non-transitory computer-readable recording medium as in claim 3, wherein
when the computer-readable instructions are installed in the terminal device, the first setting value and the fourth setting value are stored in the memory.

5. The non-transitory computer-readable recording medium as in claim 4, wherein
the computer-readable instructions, when executed by the processor of the terminal device, further cause the terminal device to:
display a selection screen on the display unit when the computer-readable instructions are installed in the terminal device, the selection screen being for selecting whether to permit use of the user-related information,
wherein in a case where permission for the use of the user-related information is selected on the selection screen, the first setting value and the third setting value are stored in the memory, and in a case where non-permission for the use of the user-related information is selected on the selection screen, the first setting value and the fourth setting value are stored in the memory.

6. The non-transitory computer-readable recording medium as in claim 4, wherein
in a case where a usage area in which the computer-readable instructions are used is a first area, the first setting value and the fourth setting value are stored in the memory, and
in a case where the usage area is a second area different from the first area, the second setting value and the fourth setting value are stored in the memory.

7. The non-transitory computer-readable recording medium as in claim 3, wherein
the computer-readable instructions, when executed by the processor of the terminal device, further cause the terminal device to:
display a selection screen on the display unit when the computer-readable instructions are installed in the terminal device, the selection screen being for selecting whether to permit use of the user-related information,
wherein in a case where permission for the use of the user-related information is selected on the selection screen, the third setting value is stored in the memory, and
in a case where non-permission for the use of the user-related information is selected on the selection screen, the fourth setting value is stored in the memory.

8. The non-transitory computer-readable recording medium as in claim 3, wherein
in a case where a usage area in which the computer-readable instructions are used is a first area, the first setting value is stored in the memory, and
in a case where the usage area is a second area different from the first area, the second setting value is stored in the memory.

9. The non-transitory computer-readable recording medium as in claim 1, wherein
the setting screen comprises the second selective object having a display manner that allows selection on whether to enable the second-type notification in a case where enablement of the first-type notification is selected at the first selective object, and
the setting screen does not comprise the second selective object having the display manner that allows selection on whether to enable the second-type notification in a case where disablement of the first-type notification is selected at the first selective object.

10. The non-transitory computer-readable recording medium as in claim 1, wherein
the computer-readable instructions, when executed by the processor of the terminal device, further cause the terminal device to:
send result information to a server, wherein the result information indicating a selection result at the second selective object in the setting screen; and
in a case where the result information indicating that the second-type notification is to be enabled is sent to the server, receive notification information for displaying the second-type notification from the server, wherein in a case where the result information indicating that the second-type notification is not to be enabled is sent to the server, the notification information for displaying the second-type notification is not received.

11. The non-transitory computer-readable recording medium as in claim 1, wherein
the first-type notification is a notification for which the user-related information stored in a server is not used by the server, and
the second-type notification is a notification for which the user-related information stored in the server is used by the server.

12. The non-transitory computer-readable recording medium as in claim 1, wherein
the target device is a printing device, and
the user-related information comprises at least one of identification information of the printing device, a model name of the printing device, a model number of a consumable article currently installed in the printing device, a remaining amount of the consumable article, and information indicating whether the user receives a predetermined service for the printing device.

13. A terminal device, comprising:
a controller, and
a display unit,
wherein
the controller is configured to display a setting screen on the display unit of the terminal device, the setting screen being for setting whether to enable a notification related to a target device used by a user of the terminal device, and
the setting screen comprises:
a first selective object for selecting whether to enable a first-type notification for which user-related information related to the user is not used, and
a second selective object for selecting whether to enable a second-type notification for which the user-related information is used.

14. A control method for a terminal device, comprising:
displaying a setting screen on a display unit of the terminal device, the setting screen being for setting whether to enable a notification related to a target device used by a user of the terminal device, and
wherein the setting screen comprises:
a first selective object for selecting whether to enable a first-type notification for which user-related information related to the user is not used, and
a second selective object for selecting whether to enable a second-type notification for which the user-related information is used.

15. The control method as in claim 14, comprising:
storing a setting value according to a selection result on the setting screen in a memory of the terminal device,
wherein either a first setting value indicating that the first-type notification is to be enabled or a second setting value indicating that the first-type notification is not to be enabled is stored in the memory, and
either a third setting value indicating that the second-type notification is to be enabled or a fourth setting value indicating that the second-type notification is not to be enabled is stored in the memory.

16. The control method as in claim 14, comprising:
storing a setting value in a memory of the terminal device when computer-readable instructions for displaying the setting screen are installed in the terminal device,
wherein either a first setting value indicating that the first-type notification is to be enabled or a second setting value indicating that the first-type notification is not to be enabled is stored in the memory, and
either a third setting value indicating that the second-type notification is to be enabled or a fourth setting value indicating that the second-type notification is not to be enabled is stored in the memory.

17. The control method as in claim 16, wherein when the computer-readable instructions are installed in the terminal device, the first setting value and the fourth setting value are stored in the memory.

18. The control method as in claim 17, wherein displaying a selection screen on the display unit when the computer-readable instructions are installed in the terminal device, the selection screen being for selecting whether to permit use of the user-related information, wherein in a case where permission for the use of the user-related information is selected on the selection screen, the first setting value and the third setting value are stored in the memory, and in a case where non-permission for the use of the user-related information is selected on the selection screen, the first setting value and the fourth setting value are stored in the memory.

19. The control method as in claim 17, wherein in a case where a usage area in which the computer-readable instructions are used is a first area, the first setting value and the fourth setting value are stored in the memory, and in a case where the usage area is a second area different from the first area, the second setting value and the fourth setting value are stored in the memory.

20. The control method as in claim 16, comprising: displaying a selection screen on the display unit when the computer-readable instructions are installed in the terminal device, the selection screen being for selecting whether to permit use of the user-related information, wherein in a case where permission for the use of the user-related information is selected on the selection screen, the third setting value is stored in the memory, and in a case where non-permission for the use of the user-related information is selected on the selection screen, the fourth setting value is stored in the memory.

* * * * *